United States Patent
Lee (10) Patent No.: US 8,675,053 B2
(45) Date of Patent: Mar. 18, 2014

(54) VIDEO PROCESSING APPARATUS AND VIDEO PROCESSING METHOD FOR SCALING THREE-DIMENSIONAL DATA

(75) Inventor: Bong-geun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1274 days.

(21) Appl. No.: 12/023,065

(22) Filed: Jan. 31, 2008

(65) Prior Publication Data

US 2009/0027488 A1  Jan. 29, 2009

(30) Foreign Application Priority Data

Jul. 26, 2007 (KR) .................. 10-2007-0075013

(51) Int. Cl.
 *H04N 13/04* (2006.01)
(52) U.S. Cl.
 USPC .............................. 348/54; 348/51
(58) Field of Classification Search
 USPC ............................... 348/54–60, 51
 See application file for complete search history.

(56) References Cited

U.S. PATENT DOCUMENTS

| | | | |
|---|---|---|---|
| 5,717,415 A * | 2/1998 | Iue et al. ............... | 345/8 |
| 6,094,216 A * | 7/2000 | Taniguchi et al. ....... | 348/51 |
| 6,160,574 A * | 12/2000 | Oba et al. ............... | 348/46 |
| 7,215,357 B1 * | 5/2007 | Swift et al. ............. | 348/56 |
| 7,580,463 B2 * | 8/2009 | Routhier et al. ........ | 375/240.25 |
| 7,830,601 B2 * | 11/2010 | Takagi et al. ........... | 359/463 |
| 8,525,872 B2 * | 9/2013 | Choi et al. ............. | 348/51 |
| 2008/0024598 A1 * | 1/2008 | Perlin et al. ............ | 348/55 |
| 2009/0027488 A1 * | 1/2009 | Lee ....................... | 348/54 |

FOREIGN PATENT DOCUMENTS

| | | |
|---|---|---|
| JP | 9-116930 A | 5/1997 |
| JP | 11-88911 A | 3/1999 |
| KR | 10-2005-0049623 A | 5/2005 |
| KR | 10-2006-0006706 A | 1/2006 |
| KR | 10-2006-0019012 A | 3/2006 |

OTHER PUBLICATIONS

Communication, dated Apr. 10, 2013, issued by the Korean Intellectual Property Office in counterpart Korean Patent Application No. 10-2007-0075013.

* cited by examiner

*Primary Examiner* — Gregory Todd
(74) *Attorney, Agent, or Firm* — Sughrue Mion, PLLC (57) ABSTRACT

There are provided a video processing apparatus and a video processing method. The video processing apparatus includes: a plurality of signal delay parts which sequentially store left-eye pixel information and right-eye pixel information that are alternately supplied; an interpolation unit which interpolates the right-eye pixel information and separately interpolates the left-eye pixel information; and an image generating unit which generates a left-eye image and a right-eye image based on the interpolated left-eye pixel information and the interpolated right-eye pixel information, respectively.

8 Claims, 6 Drawing Sheets

VIDEO PROCESSING APPARATUS AND VIDEO PROCESSING METHOD FOR SCALING THREE-DIMENSIONAL DATA

CROSS-REFERENCE TO RELATED APPLICATIONS

This application claims priority from Korean Patent Application No. 10-2007-0075013, filed on Jul. 26, 2007 in the Korean Intellectual Property Office, the disclosure of which is incorporated herein by reference in its entirety.

BACKGROUND OF INVENTION

1. Field of Invention

Apparatuses and methods consistent with the present invention relate to video processing, and more particularly, to video processing wherein left-eye pixel information and right-eye pixel information are alternately supplied for 3-dimensional scaling.

2. Description of Related Art

A video processing apparatus such as a television set, a projector, and so on can provide an effect of representing an image in a 3-dimensional space through a process of 3-dimensional image signal. The video processing apparatus alternately displays a left-eye image and a right-eye image identical to what left and right eyes of a viewer see in frame units to provide a time difference between two eyes, and thus, displays a stereoscopic image. Then, the viewer can realize the stereoscopic image through polarized glasses.

The video processing apparatus processes the 3-dimensional image signal in which a left-eye signal and a right-eye signal are alternately supplied to produce the left-eye image and right-eye image. The 3-dimensional image signal may be provided in pixel units, line units, or frame units. For example, a pixel by pixel 3-dimensional video signal may be provided with left-eye pixel information and right-eye pixel information in a manner of R1 L1 R2 L2 ... Rn Ln, where R1, R2 ... are the right-eye pixel information, and L1, L2 ... are the left eye pixel information.

Meanwhile, the video processing apparatus can adjust a size of the image. Specifically, the video processing apparatus uses interpolation for scaling to generate the size-adjusted pixel information of the image.

Figure 1:
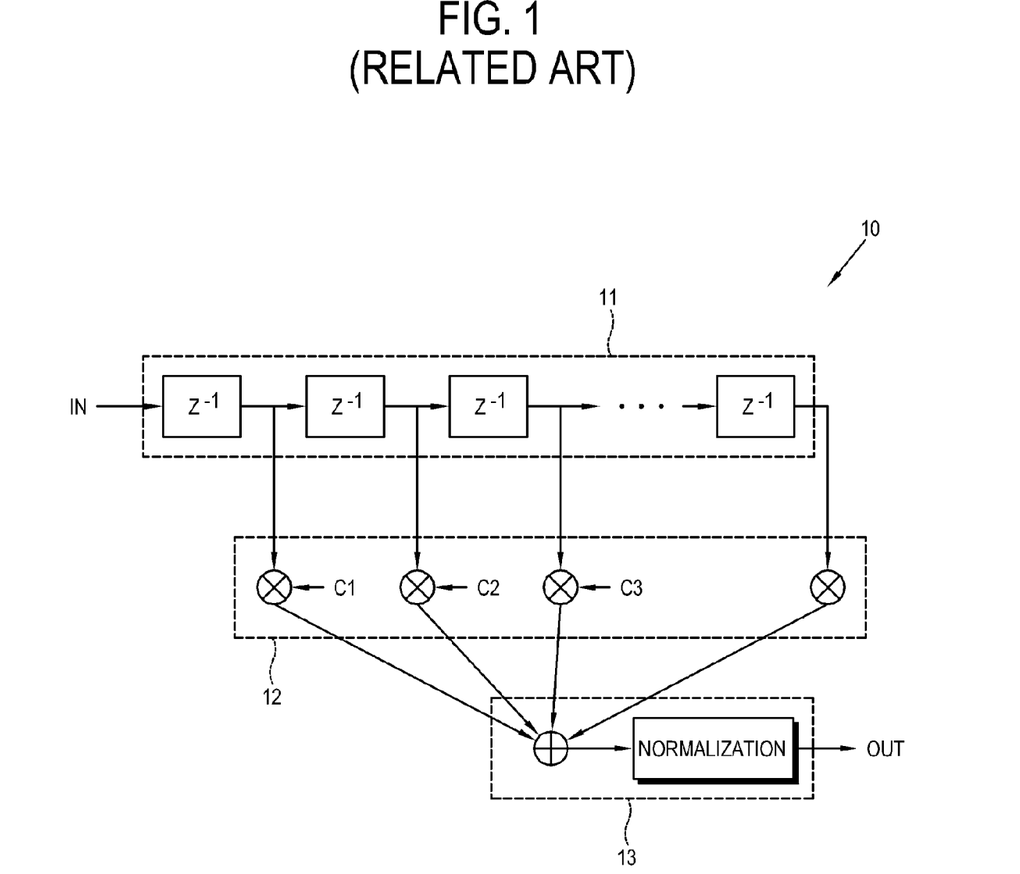
FIG. 1 is a block diagram illustrating a related art video processing apparatus.

As shown in FIG. 1, a related art video processing apparatus 10 includes a plurality of signal delay units 11, an interpolation coefficient applying unit 12, and an interpolation/normalization unit 13. The signal delay units 11 store and delay input pixel information in a reference clock unit. The interpolation coefficient applying unit 12 applies a coefficient Cn necessary for interpolation on the pixel information stored in the signal delay units 11. The interpolation/normalization unit 13 interpolates the pixel information to which the coefficient Cn is applied and then performs a normalization process on the interpolated data and adjusts the gain between pixels.

However, such a related art video processing apparatus cannot perform an appropriate scaling for a 3-dimensional image because of the following problem. The 3-dimensional image signal is alternately input with the left-eye pixel information and the right-eye pixel information. If the related art interpolation processes supplied information in sequential order, the 3-dimensional effect may be disappeared because the interpolation is carried out without discriminating the left and right pixel information.

Though there is also a method of separately providing an interpolation processing unit for left or right-eye pixel information, it is not efficient.

SUMMARY OF INVENTION

The present invention provides a video processing apparatus and a video processing method that can appropriately scale a 3-dimensional image.

The present invention also provides a video processing apparatus and a video processing method using one interpolation performing unit to interpolate left and right-eye pixel information without providing separate interpolation performing units.

According to an aspect of the present invention, there is provided a video processing apparatus including: a plurality of signal delay parts which sequentially store left-eye pixel information and right-eye pixel information that are alternately supplied; an interpolation unit which interpolates the stored right-eye pixel information and separately interpolates the stored left-eye pixel information; and an image generating unit which generates a left-eye image and a right-eye image based on the interpolated left-eye pixel information and the interpolated right-eye pixel information, respectively.

The left-eye pixel information and/or the right-eye pixel information may include a brightness signal value and a chrominance signal value.

The interpolation unit may interpolate the left-eye pixel information by multiplying the brightness signal value and the chrominance signal value by an interpolation coefficient.

The video processing apparatus may further include a display unit which displays the left-eye image and the right-eye image generated in the image generating unit.

The left-eye pixel information may be stored in the 2nth signal delay parts among the plurality of the signal delay parts and the right-eye pixel information may be stored in the (2n−1)th signal delay parts among the plurality of the signal delay parts.

According to another aspect of the present invention, there is provided a video processing method including: sequentially storing, in a plurality of signal delay parts, left-eye pixel information and right-eye pixel information that are alternately supplied; interpolating the stored left-eye pixel information and separately interpolating the stored right-eye pixel information; and generating a left-eye image and a right-eye image based on the interpolated left-eye pixel information and the interpolated right-eye pixel information, respectively.

The left-eye pixel information and/or the right-eye pixel information may include a brightness signal value and a chrominance signal value.

The interpolating the left-eye pixel information may include multiplying the brightness value and the chrominance signal value by an interpolation coefficient.

The video processing method may further include: displaying the generated left-eye image and the generated right-eye image.

BRIEF DESCRIPTION OF DRAWINGS

The above and/or other aspects of the present invention will become apparent and more readily appreciated from the following description of the exemplary embodiments, taken in conjunction with the accompanying drawings of which.

DETAILED DESCRIPTION OF EXEMPLARY EMBODIMENTS

Reference will now be made in detail to the embodiments of the present general inventive concept, examples of which are illustrated in the accompanying drawings, wherein like reference numerals refer to like elements throughout. The exemplary embodiments are described below so as to explain the present general inventive concept by referring to the figures.

Figure 2:
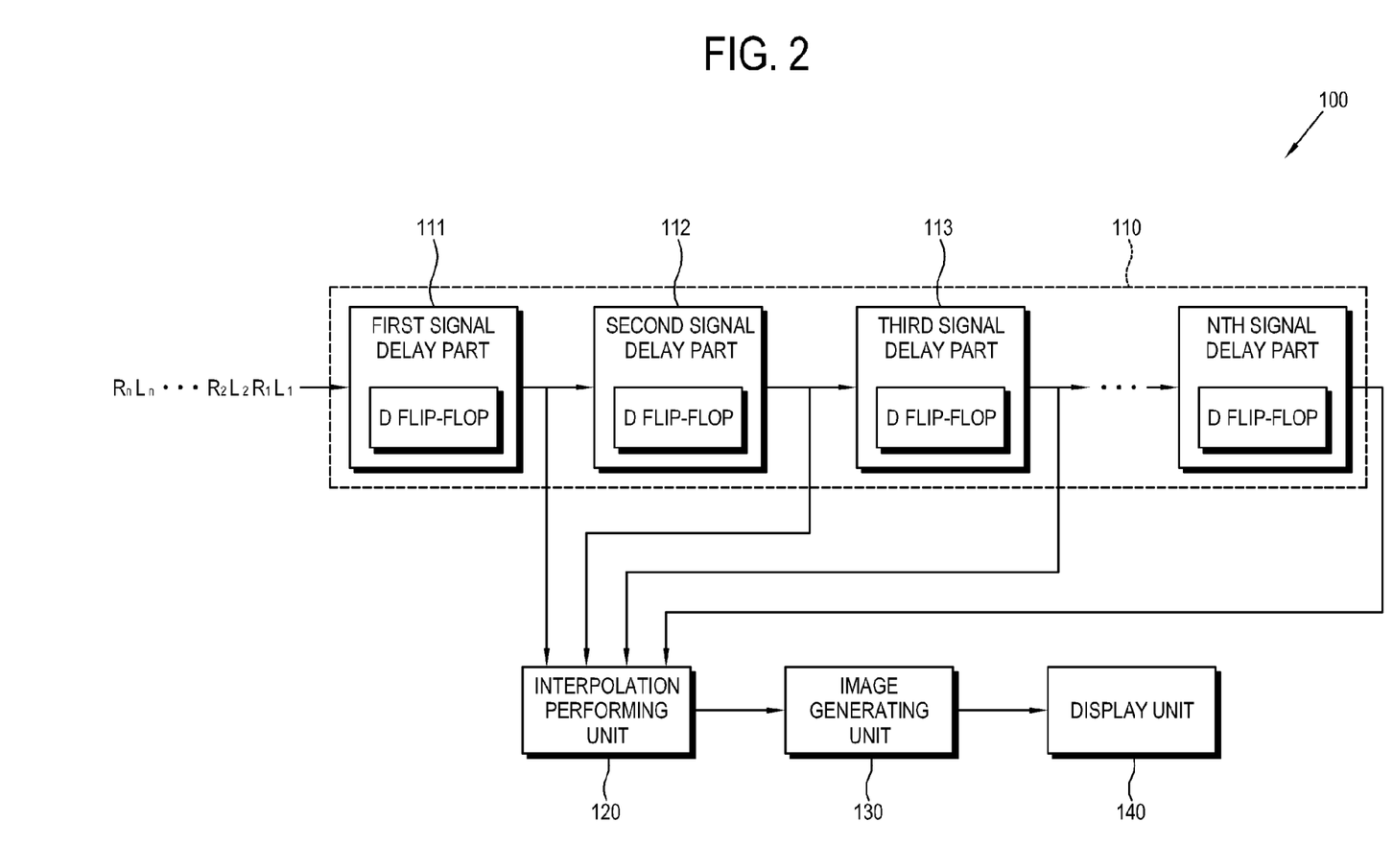
FIG. 2 is a block diagram illustrating a video processing apparatus according to a first exemplary embodiment of the present invention.

FIG. 2 is a block diagram illustrating a video processing apparatus 100 according to a first exemplary embodiment of the present invention. The video processing apparatus 100 scales a 3-dimensional image with left-eye pixel information and right-eye pixel information which are alternately supplied. Further, interpolation may be used when the pixel information undergoes a scaling process in the video processing apparatus 100 according to the exemplary embodiment of the present invention. The video processing apparatus 100 may be embodied by a TV, for example.

As shown in FIG. 2, the video processing apparatus 100 includes a plurality of signal delay units 110, an interpolation performing unit 120, an image generating unit 130 and a display unit 140. The interpolation performing unit 120 includes an interpolation coefficient applying unit 120a and an interpolation/normalization unit 120b (refer to FIGS. 3A and 3B).

The plurality of signal delay units 110 include signal delay parts 111, 112 and 113, and so on which are sequentially arranged and sequentially store the alternately supplied left and right pixel information. The pixel information may include a brightness signal value and a chrominance signal value. Each signal delaying part 111, 112, 113, or the like stores single input pixel information and outputs the stored pixel information to the next signal delaying part in a reference clock unit. Each signal delaying part 111, 112, 113, or the like may include a D flip-flop. The D flip-flop is used to delay outputting of the input signal as much as a time interval of a clock pulse.

For example, if the left-eye pixel information and the right-eye pixel information are input in a pattern of R1 L1 R2 L2 . . . Rn Ln to the plurality of signal delaying units 110, the first input R1 is stored in the first signal delaying part 111. After one clock cycle elapses, R1 in the first signal delaying part 111 is output to the second signal delaying part 112 and the interpolation performing unit 120, and a next input L1 is stored in the first signal delaying part 111. The second signal delaying part 112 stores R1 that was output from the first signal delaying part 111. After another clock cycle, L1 in the first signal delaying part 111 is output to the second signal delaying part 112 and the interpolation performing unit 120, and a next input R2 is stored in the first signal delaying part 111. R1 in the second signal delaying part 112 is output to the third signal delaying part 113 and the interpolation performing unit 120, and the input L1 is stored in the second signal delaying part 112.

Any one of the interpolation of the pixel information between the 2nth (even) signal delaying parts and the interpolation of the pixel information between (2n−1)th (odd) signal delaying parts is performed by the interpolation performing unit 120. Here, 2n is a number of the signal delaying parts. Accordingly, the interpolation can be performed with respect to the left-eye pixel information and the right-eye pixel information by the interpolation performing unit 120. This is possible because the plurality of signal delaying units 110 do not continuously store any one of the left-eye pixel information and the right-eye pixel information but alternately store both the pixel in format ion.

Figure 3A:
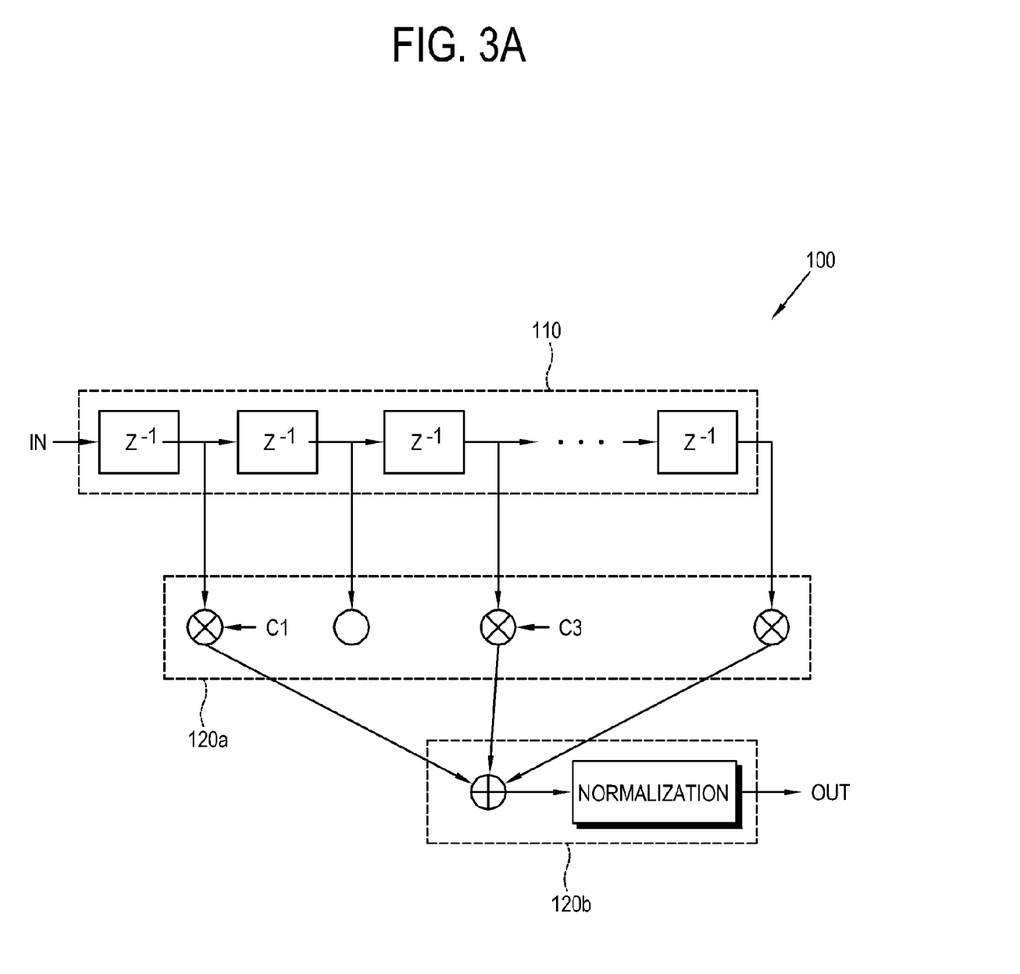
FIGS. 3A and 3B specifically illustrate an operation of the video processing apparatus according to the first exemplary embodiment of the present invention.

For example, if the left-eye pixel information is stored in the odd number signal delaying parts like the first signal delaying part 111, the third signal delaying part 113 and so on at a certain clock cycle, the right-eye pixel information is stored in the even number signal delaying parts like the second signal delaying part 112, and so on. Then, the left-eye pixel information can be interpolated separately without mixing with the right pixel information if the interpolation is performed between the pixel information stored in the odd number signal delaying parts as shown in FIG. 3A. The same effect may be achieved for the interpolation of the pixel information stored in the even number signal delaying parts.

The interpolation performing unit 120 is designed to receive only one pixel information between the 2nth (even) signal delaying parts and the (2n−1)th (odd) signal delaying parts, to prevent the interpolation of the pixel information from the 2nth (even) signal delaying parts and the pixel information from the (2n−1)th (odd) signal delaying parts from being mixed with each other.

The interpolation by the interpolation performing unit 120 is performed by multiplying the brightness signal value and the chrominance signal value by a predetermined interpolation coefficient. The interpolation coefficient may be varied depending on a method of the interpolation. A plurality of the interpolation coefficients correspond with the plurality of the signal delay units 110, respectively. For example, if the signal delaying parts are 10, the interpolation coefficients are also 10. The interpolation coefficient applied to the pixel information stored in the nth signal delaying part is the nth interpolating coefficient.

In other words, the brightness signal value and the chrominance signal value of the pixel information supplied from the 2nth signal delaying part are multiplied by the 2nth interpolation coefficient, and the brightness signal value and the chrominance signal value of the pixel information supplied from the (2n−1)th signal delaying part are multiplied by the (2n−1)th interpolation coefficient in the interpolation performing unit 120.

As shown in FIG. 3A, the plurality of signal delaying units 110 supply the pixel information stored in the odd number signal delaying parts to the interpolation coefficient applying unit 120a. The interpolation coefficient applying unit 120a multiplies the pixel information stored in the odd number signal delaying parts by the odd number interpolation coefficients C1, C3 . . . C(2n−1), respectively, and supplies the result to the interpolation/normalization unit 120b. The interpolation/normalization unit 120b outputs a result of normalization after summing the supplied values.

Figure 3B:
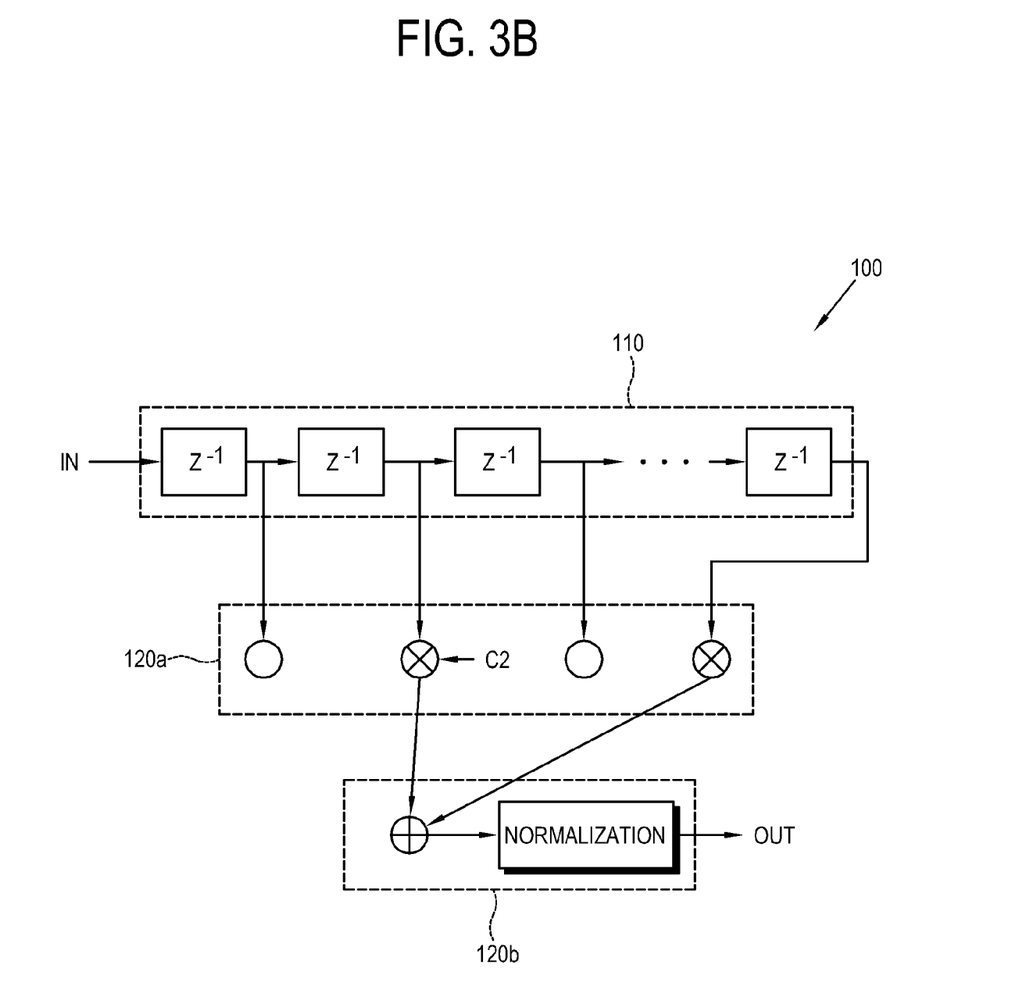

As shown in FIG. 3B, the plurality of signal delaying units 110 supply the pixel information stored in the even number signal delaying parts to an interpolation coefficient applying unit 120a. The interpolation coefficient applying unit 120a multiplies the pixel information stored in the even number signal delaying parts by the even number interpolation coefficients C2, C4 ... C2n, respectively, and supplies the result to the interpolation/normalization unit 120b. The interpolation/normalization unit 120b outputs a result of normalization after summing the supplied values.

On the other hand, an interpolation coefficient of zero can be applied in the interpolation performing unit 120 for the pixel information stored in the 2nth (even) signal delaying parts or in the (2n−1)th (odd) signal delaying parts of the plurality of the signal delaying units. For example, if zero is set for the 2nth interpolation coefficient among the plurality of the interpolation coefficients, only the (2n−1)th interpolation coefficients are effectively applicable, and, if zero is set for the (2n−1)th interpolation coefficient, only 2nth interpolation coefficients are effectively applicable.

Referring to FIG. 2, the image generating unit 130 generates a left-eye image and a right-eye image based on the interpolated pixel information. The image generating unit 130 forms the left-eye image based on the interpolated left-eye pixel information and the right-eye image based on the interpolated right-eye pixel information.

The display unit 140 displays the left-eye image and the right-eye image generated in the image generating unit 130. The display unit 140 may alternately display the left-eye image and the right-eye image generated in the image generating unit 130 in the display. The display unit 140 may be realized by a cathode ray tube (CRT), a liquid crystal display (LCD), a plasma display panel (PDP), and so on.

Figure 4:
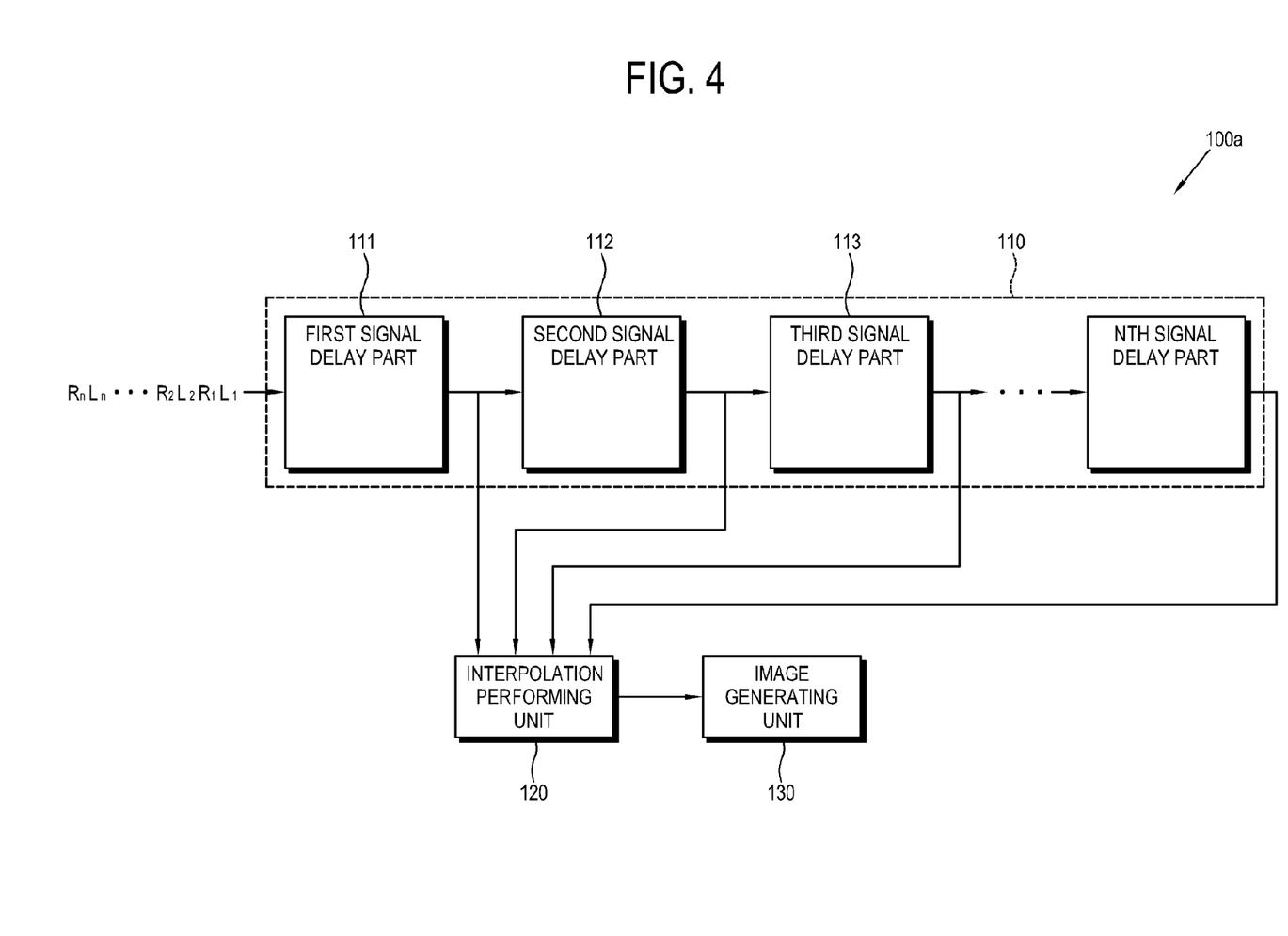
FIG. 4 is a block diagram illustrating a video processing apparatus according to a second exemplary embodiment of the present invention.

FIG. 4 is a block diagram illustrating a video processing apparatus 100a according to a second exemplary embodiment of the present invention. As shown in FIG. 4, the video processing apparatus 100a includes a plurality of signal delay units 110, an interpolation performing unit 120, and an image generating unit 130. That is, the video processing apparatus 100a of the second exemplary embodiment may not include the display unit 140 in the video processing apparatus 100 according to the first exemplary embodiment of the present invention.

Figure 5:
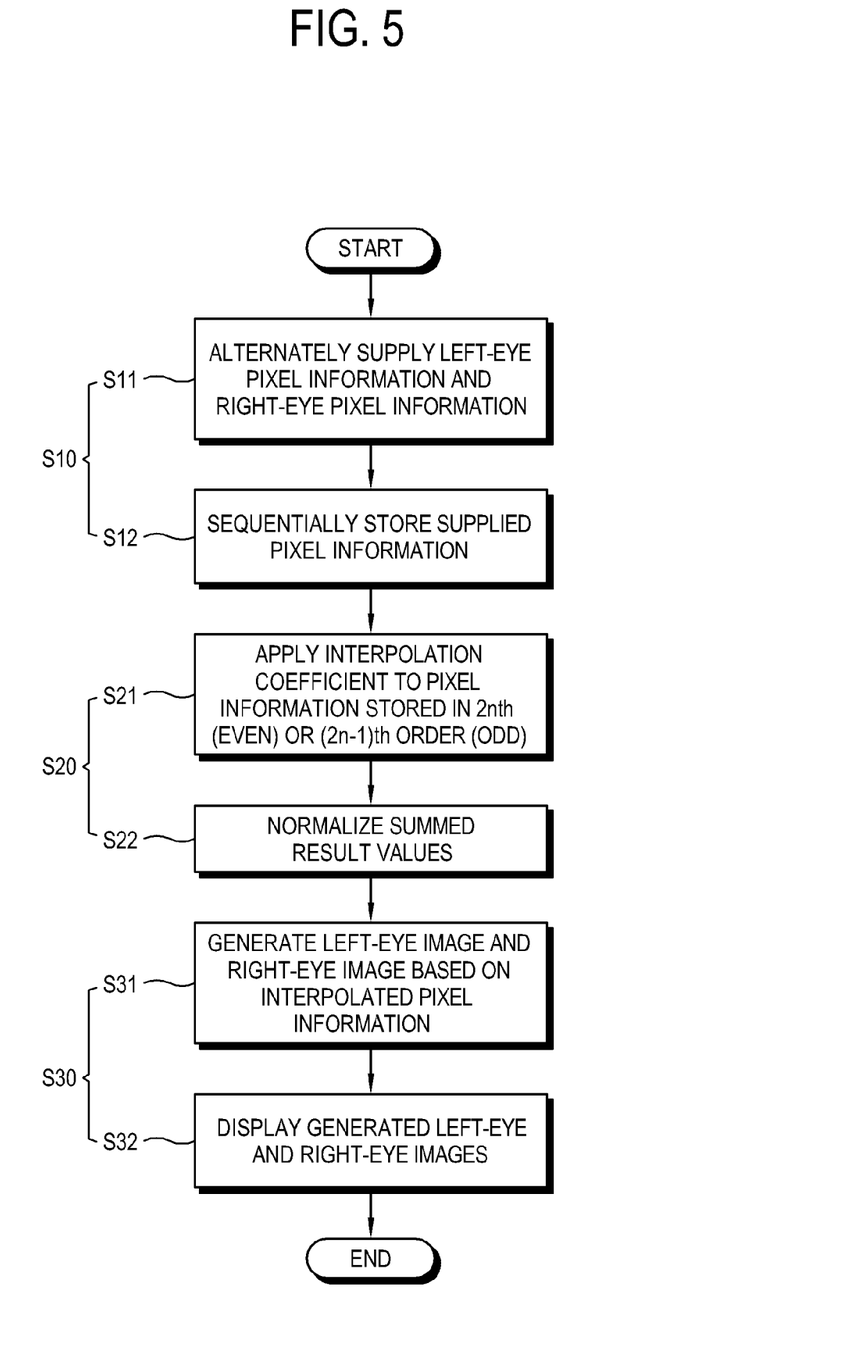
FIG. 5 is a flow chart for illustrating a video processing method according to an exemplary embodiment of the present invention.

Hereinafter, a video processing method according to an exemplary embodiment of the present invention is described with reference to FIG. 5.

The video processing apparatus 100 sequentially stores the alternately supplied left-eye pixel information and the right-eye information (S10). The video processing apparatus 100 performs the interpolation with 2nth (even) signal delaying parts or (2n−1)th (odd) signal delaying parts among the sequentially stored pixel information (S20). The video processing apparatus 100 generates the left-eye image and the right-eye image based on the interpolated pixel image (S30).

Operation S10 includes operations S11 and S12. First, the left-eye pixel information and the right-eye information are alternately supplied (S11). The 3-dimensional image signal is configured of the alternated left-eye pixel information to generate the left-eye image and right-eye pixel information to generate the right-eye image.

The video processing apparatus 100 sequentially stores the supplied pixel information (S12). For example, if the left-eye pixel information and the right-eye information are input in a pattern of R1 L1 R2 L2 . . . Rn Ln to the plurality of signal delaying units 110, the first input R1 is stored in the first signal delaying part 111. After one clock cycle elapses, R1 in the first signal delaying part 111 is output to the second signal delaying part 112 and the interpolation performing unit 120, and a next input L1 is stored in the first signal delaying part 111. After another clock cycle, L1 in the first signal delaying part 111 is output to the second signal delaying part 112 and the interpolation performing unit 120, and a next input R2 is stored in the first signal delaying part 111. R1 in the second signal delaying part 112 is output to the third signal delaying part 113 and the interpolation performing unit 120, and the input L1 is stored in the second signal delaying part 112.

The subsequent operation S20 includes operations S21 and S22. The video processing apparatus 100 applies the interpolation coefficient to the 2nth (even) pixel information or the (2n−1)th (odd) pixel information from the sequentially stored pixel information. As shown in FIG. 3A, the plurality of signal delaying units 110 supply the pixel information stored in the odd number signal delaying parts to the interpolation coefficient applying unit 120a. The interpolation coefficient applying unit 120a multiplies the pixel information stored in the odd number signal delaying parts by the odd number interpolation coefficients C1, C3 . . . C(2n−1) and supplies the result to the interpolation/normalization unit 120b (S21). The video processing apparatus 100 sums the result values of the pixel information applied with the interpolation coefficients, normalizes it, and outputs a normalization result, through the interpolation/normalization unit 120b (S22).

Next, operation S30 is carried out which includes operations S31 and S32. The video processing apparatus 100 generates the left-eye image and the right-eye image based on the interpolated pixel information through the image generating unit 130 (S31). The video processing unit 100 displays the generated left-eye image and the right-eye image through the display unit 140 (S32). According to exemplary embodiments of the present invention, the video processing apparatus can appropriately scale a 3-dimensional image.

Also, the video processing apparatus according to exemplary embodiments of the present invention may use one interpolation performing unit to interpolate left and right-eye pixel information without separately providing interpolation performing units.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A video processing apparatus comprising:
   a processor;
   a plurality of signal delay parts which sequentially store left-eye pixel information and right-eye pixel information that are alternately supplied;
   an interpolation unit which interpolates the stored right-eye pixel information at a first clock cycle with a first set of coefficients and separately interpolates the stored left-eye pixel information at a second clock cycle different from the first clock cycle with a second set of coefficients different from the first set; and
   an image generating unit which generates, using the processor, a left-eye image and a right-eye image based on the interpolated left-eye pixel information and the interpolated right-eye pixel information, respectively,
   wherein the left-eye pixel information is stored in 2nth signal delay parts among the plurality of the signal delay parts and the right-eye pixel information is stored in (2n−1)th signal delay parts among the plurality of the signal delay parts, and
   wherein the interpolation unit receives only one pixel information from among the 2nth signal delay parts and the (2n−1)th signal delay parts at a given clock cycle, to prevent interpolation of pixel information from the 2nth signal delay parts and pixel information from the (2n−1)th signal delay parts from being mixed with each other.

2. The video processing apparatus according to claim 1, wherein the left-eye pixel information comprises a brightness signal value and a chrominance signal value.

3. The video processing apparatus according to claim 2, wherein the interpolation unit interpolates the left-eye pixel information by multiplying the brightness signal value and the chrominance signal value by an interpolation coefficient from among the second set of coefficients.

4. The video processing apparatus according to claim 1, further comprising a display unit which displays the left-eye image and the right-eye image generated in the image generating unit.

5. A video processing method comprising:
sequentially storing, in a plurality of signal delay parts, left-eye pixel information and right-eye pixel information that are alternately supplied;
interpolating the stored left-eye pixel information at a first clock cycle with a first set of coefficients and separately interpolating the stored right-eye pixel information at a second clock cycle different from the first clock cycle with a second set of coefficients different from the first set; and
generating, using a processor, a left-eye image and a right-eye image based on the interpolated left-eye pixel information and the interpolated right-eye pixel information, respectively,
wherein the left-eye pixel information is stored in 2nth signal delay parts among the plurality of the signal delay parts and the right-eye pixel information is stored in (2n−1)th signal delay parts among the plurality of the signal delay parts,
wherein the interpolating comprises receiving only one pixel information from among the 2nth signal delay parts and the (2n−1)th signal delay parts at a given clock cycle, to prevent interpolation of pixel information from the 2nth signal delay parts and pixel information from the (2n−1)th signal delay parts from being mixed with each other.

6. The video processing method according to claim 5, wherein the left-eye pixel information comprises a brightness signal value and a chrominance signal value.

7. The video processing method according to claim 6, wherein the interpolating the left-eye pixel information comprises multiplying the brightness value and the chrominance signal value by an interpolation coefficient from among the second set of coefficients.

8. The video processing method according to claim 5, further comprising:
displaying the generated left-eye image and the generated right-eye image.

* * * * *